(12) United States Patent
Sugita

(10) Patent No.: US 9,179,023 B2
(45) Date of Patent: Nov. 3, 2015

(54) PRINTING APPARATUS, PRINTING CONTROL METHOD, AND STORAGE MEDIUM FOR RESERVATION PRINTING

(71) Applicant: CANON KABUSHIKI KAISHA, Tokyo (JP)

(72) Inventor: Hikaru Sugita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/558,451

(22) Filed: Dec. 2, 2014

(65) Prior Publication Data

US 2015/0156341 A1 Jun. 4, 2015

(30) Foreign Application Priority Data

Dec. 4, 2013 (JP) .................. 2013-251392

(51) Int. Cl.
*H04N 1/00* (2006.01)
*G06F 3/12* (2006.01)

(52) U.S. Cl.
CPC ............ *H04N 1/0048* (2013.01); *G06F 3/1228* (2013.01); *G06F 3/1292* (2013.01); *H04N 1/00352* (2013.01); *H04N 1/00474* (2013.01); *H04N 1/00477* (2013.01); *H04N 1/00482* (2013.01); *H04N 2201/0094* (2013.01)

(58) Field of Classification Search
CPC . G06F 3/1228; G06F 3/1292; H04N 1/00352; H04N 1/00474; H04N 1/00477; H04N 1/0048; H04N 1/00482; H04N 2201/0094
USPC ......................................................... 358/1.15
See application file for complete search history.

(56) References Cited

U.S. PATENT DOCUMENTS

2008/0309974 A1* 12/2008 Shimazaki et al. .......... 358/1.15
2012/0062915 A1* 3/2012 Hirama ......................... 358/1.9
2012/0262742 A1* 10/2012 Yano et al. .................... 358/1.9

FOREIGN PATENT DOCUMENTS

JP 2012-223891 A 11/2012

\* cited by examiner

*Primary Examiner* — Iriana Cruz
(74) *Attorney, Agent, or Firm* — Canon USA, Inc., IP Division

(57) ABSTRACT

A printing apparatus determines whether to execute reservation printing with respect to a print job according to a print job type or a protocol used to transfer the print job. Accordingly, even when the printing apparatus receives a print job that is not designated for the reservation printing, the printing apparatus can perform reservation printing or printing without reserving the print job depending on the print job.

9 Claims, 16 Drawing Sheets

FIG. 7

| PRINT SETTING ITEM | RESERVATION CONDITION | |
|---|---|---|
| NUMBER OF PAGES | 2 | ~702 |
| LAYOUT | 1in1 | ~703 |
| ONE-SIDED PRINTING/ TOW-SIDED PRINTING | ONE-SIDED PRINTING | ~704 |
| NUMBER OF COPIES | 1 | ~705 |
| MONOCHROME PRINTING/ COLOR PRINTING | MONOCHROME PRINTING | ~706 |

FIG. 15

| PROTOCOL TYPE | RESERVATION SETTING<br>ON: RESERVE PRINT JOB<br>OFF: DO NOT RESERVE PRINT JOB |
|---|---|
| LPR | OFF |
| RAW | OFF |
| WSD | ON |
| IPP | ON |

PRINTING APPARATUS, PRINTING CONTROL METHOD, AND STORAGE MEDIUM FOR RESERVATION PRINTING

BACKGROUND OF THE INVENTION

1. Field of the Invention

The present invention relates to reservation printing in which a print job is received and printing is performed based on the print job after a print instruction of the print job is received.

2. Description of the Related Art

A printing apparatus discussed in Japanese Patent Application Laid-Open No. 2012-223891 receives a print job from an external device, and reserves the print job until a print execution instruction is input on an operation panel. After a user inputs the print execution instruction on the operation panel, the printing apparatus executes printing based on the print job. In such a printing apparatus, the user can designate color printing or change the number of copies by using the operation panel after the print job is reserved.

There are two types of printing systems, a first printing system and a second printing system. In the first printing system, a printer driver installed in an external device such as a personal computer (PC) generates a print job, and transmits the print job to a printing apparatus. In the second printing system, an external device such as a smartphone or a tablet terminal instructs a print service to print a file. The print service generates a print job according to the instruction, and transmits the print job to a printing apparatus. The second printing system enables various files to be printed without a printer driver in the external device.

Although the second printing system enables the printing to be performed without a printer driver, there is a case where the print service cannot designate a print setting that can be designated by the printer driver. In such a case, the user cannot use the print setting, which can be designated by the printer driver. Consequently, the printing cannot be performed according to the print setting originally intended by the user.

The conventional printing apparatus has dealt with such a problem by awaiting designation of the print setting, which cannot be designated by the print service, from the user through the operation panel while reserving the print job issued by the print service. This enables the user to use the print setting, which cannot be designated by the print service, thereby enhancing user-friendliness.

In the conventional printing apparatus, however, when a function of reserving a print job (hereinafter referred to as reservation printing) is in operation, all of print jobs are reserved. Consequently, a print job of a user who does not intend to use the reservation printing is also reserved.

In some instances, a printer driver may designate reservation printing. However, when the printing apparatus reserves the print job only designated for reservation printing, the print job issued by the print service cannot be reserved. That is, the printing apparatus can reserve either all the print jobs or the print job only designated for reservation printing.

SUMMARY OF THE INVENTION

According to an aspect of the present invention, a printing apparatus, which is capable of executing reservation printing in which a print job is received and printing is performed based on the print job after a print instruction of the print job is received, includes a receiving unit configured to receive a print job from an external device, a printing unit configured to execute printing based on the print job received by the receiving unit, a first determination unit configured to determine a type of the print job received by the receiving unit, an instruction unit configured to input a print instruction of a print job after the receiving unit receives the print job, and a control unit configured, if a first print job received by the receiving unit is a print job that is not designated for the reservation printing and the first determination unit determines that the first print job is a first-type print job, to control the printing unit to execute printing based on the first print job after the instruction unit inputs a print instruction of the first print job, and configured, if a second print job received by the receiving unit is a print job that is not designated for the reservation printing and the first determination unit determines that the second print job is a second-type print job, to control the printing unit to execute printing based on the second print job without waiting for an input of a print instruction of the second print job from the instruction unit.

According to another aspect of the present invention, a printing apparatus, which is capable of executing reservation printing in which a print job is received and printing is performed based on the print job after a print instruction of the print job is input, includes a receiving unit configured to receive a print job from an external device, a printing unit configured to execute printing based on the print job received by the receiving unit, a first determination unit configured to determine a protocol used to transfer the print job received by the receiving unit, an instruction unit configured to input a print instruction of a print job after the receiving unit receives the print job, and a control unit configured, if a first print job received by the receiving unit is a print job that is not designated for the reservation printing and the first determination unit determines that a protocol used to transfer the first print job is a first protocol, to control the printing unit to execute printing based on the first print job after the instruction unit inputs a print instruction of the first print job, and configured, if a second print job received by the receiving unit is a print job that is not designated for the reservation printing and the first determination unit determines that a protocol used for transfer the second print job is a second protocol, to control the printing unit to execute printing based on the second print job without waiting for an input of a print instruction of the second print job from the instruction unit.

According to yet another aspect of the present invention, a printing apparatus performing printing based on a print job includes a receiving unit configured to receive a print job from an external device, a printing unit configured to execute printing based on the print job received by the receiving unit, a determination unit configured to determine a type of the print job received by the receiving unit, a setting unit configured to input a print setting of a print job after the receiving unit receives the print job, and a control unit configured, if the determination unit determines that a first print job received by the receiving unit is a first-type print job, to control the printing unit to execute printing based on the first print job after the setting unit inputs a print setting of the first print job, and configured, if the determination unit determines that a second print job received by the receiving unit is a second-type print job, to control the printing unit to execute printing based on the second print job without waiting for an input of a print setting of the second print job from the setting unit.

According to yet another aspect of the present invention, a printing apparatus performing printing based on a print job includes a receiving unit configured to receive a print job from an external device, a printing unit configured to execute printing based on the print job received by the receiving unit, a determination unit configured to determine a protocol used to transfer the print job received by the receiving unit, a setting unit configured to input a print setting of a print job after the receiving unit receives the print job, and a control unit configured, if the determination unit determines that a protocol used to transfer a first print job received by the receiving unit is a first protocol, to control the printing unit to execute printing based on the first print job after the setting unit inputs a print setting of the first print job, and configured, if the determination unit determines that a protocol used to transfer a second print job received by the receiving unit is a second protocol, to control the printing unit to execute printing based on the second print job without waiting for an input of a print setting of the second print job from the setting unit.

Further features of the present invention will become apparent from the following description of exemplary embodiments with reference to the attached drawings.

BRIEF DESCRIPTION OF THE DRAWINGS

FIG. 7 is a table indicating a reservation condition of a print job with respect to each print setting item.

FIG. 15 is a table indicating whether a print job transferred by each protocol type should be reserved on a protocol-type basis.

DESCRIPTION OF THE EMBODIMENTS

Various exemplary embodiments, features, and aspects of the invention will be described in detail below with reference to the drawings. Hereinafter, an MFP 100 is described as one example of a printing apparatus. Alternatively, the printing apparatus may be a single function peripheral (SFP) that has a printing function, but does not have a copy function.

Figure 1:
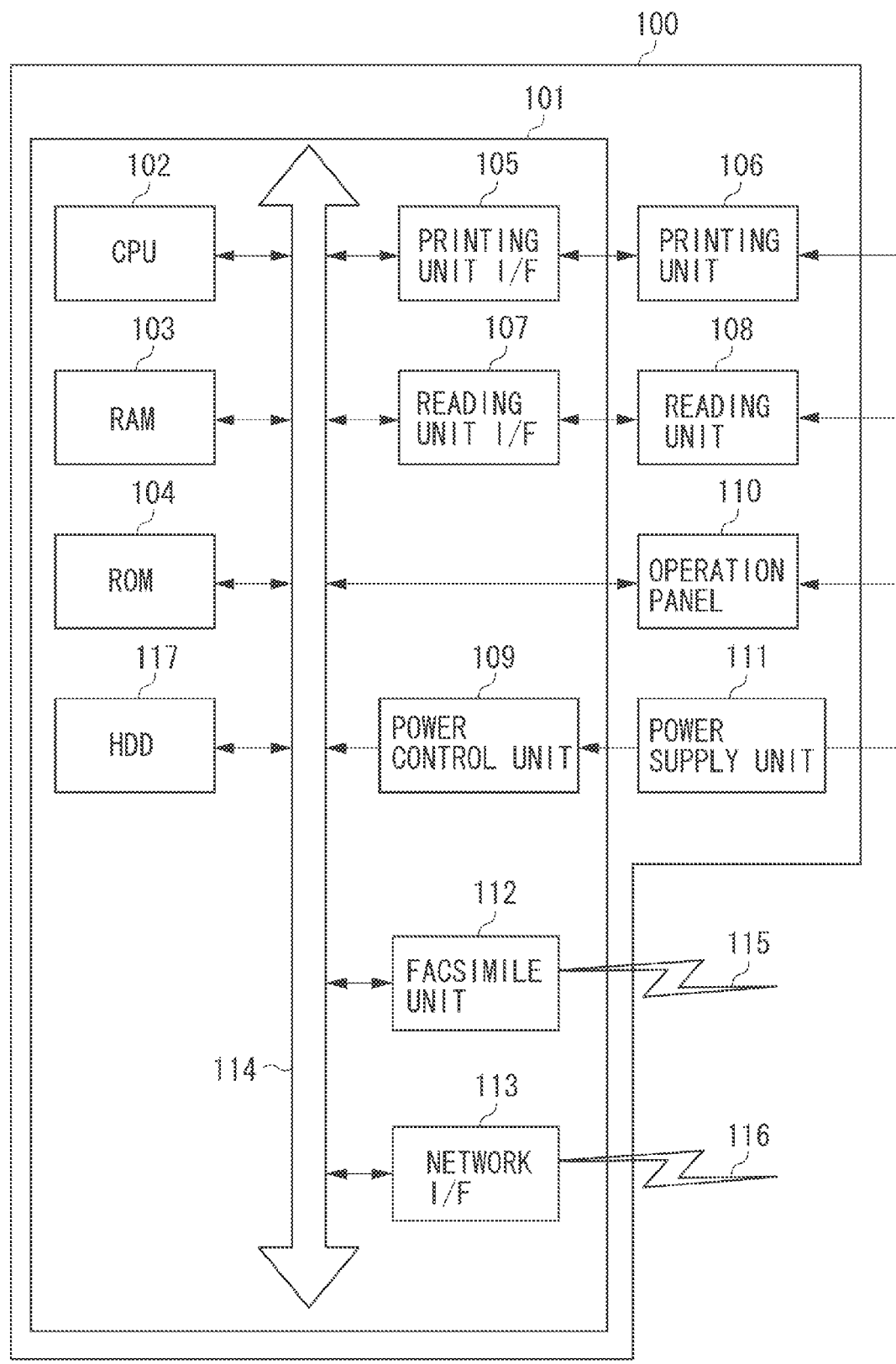
FIG. 1 is a diagram illustrating a hardware configuration of a multifunctional peripheral (MFP).

FIG. 1 is a diagram illustrating a hardware configuration of the MFP 100. The MFP 100 includes a controller 101, a printing unit 106, a reading unit 108, an operation panel 110, and a power supply unit 111. The controller 101 includes a central processing unit (CPU) 102, a random access memory (RAM) 103, a read only memory (ROM) 104, a printing unit interface (I/F) 105, and a reading unit interface (I/F) 107. Moreover, the controller 101 includes a power control unit 109, a facsimile unit 112, a network interface (I/F) 113, a system bus 114, and a hard disk drive (HDD) 117. The CPU 102, the RAM 103, the ROM 104, the printing unit I/F 105, the reading unit I/F 107, the power control unit 109, the facsimile unit 112, the network I/F 113, and the HDD 117 are connected to the system bus 114.

The CPU 102 comprehensively controls the MFP 100 serving as the printing apparatus according to various control programs. The ROM 104 stores the various control programs. The CPU 102 reads out the control program from a program area of the ROM 104 to the RAM 103, and executes the control program stored in the RAM 103. In a case where a compressed control program is stored in the ROM 104, the CPU 102 decompresses the compressed control program and stores the decompressed control program in the RAM 103 to execute this decompressed control program. The control program to be executed by the CPU 102 may be stored in the HDD 117. The ROM 104 is a non-volatile memory such as a flash ROM. The ROM 104 can retain data even when the power supplied thereto is shut off. In some types of printing apparatuses, the HDD 117 may not be disposed.

The printing unit I/F 105 serves as an interface for outputting image signals to the printing unit 106. The reading unit I/F 107 serves as an interface for receiving image signals input from the reading unit 108. When the MFP 100 executes a copy function, the CPU 102 processes the image signals input from the reading unit 108 through the reading unit I/F 107, and outputs the resultant image signals for printing to the printing unit 106 through the printing unit I/F 105. The printing unit 106 prints an image on a sheet based on the image signals. The reading unit 108 reads an image on a sheet to generate image signals for the image.

The power supply unit 111 supplies electric power to the printing unit 106, the reading unit 108, the power control unit 109, and the operation panel 110. The power control unit 109 receives the power from the power supply unit 111, and supplies the power to each device of the controller 101 via a power line (not illustrated).

The facsimile unit 112 performs facsimile communications with an external device (e.g., a facsimile apparatus) connected to a telephone line 115. For example, the facsimile unit 112 transmits image data to the external device via the telephone line 115. Moreover, the facsimile unit 112 receives image data from the external device via the telephone line 115.

The network I/F 113 is connected to a network 116 to perform network communications with an external device (e.g., a personal computer, a smartphone, and a tablet terminal) via the network 116. The network 116 conforms to a 10BASE-T, 100BASE-T, and a token ring, for example. According to the exemplary embodiment, the network I/F 113 receives a print job from the external device via the network 116. In the communications with the external device, various protocols such as a hypertext transfer protocol (HTTP), an internet printing protocol (IPP), a line printer daemon (LPR) protocol, a raw protocol (RAW), and a web services for devices (WSD) protocol are used. In addition to these protocols, a wireless technology such as a wireless local area network (WLAN) and a wireless fidelity (Wi-Fi) may be used.

Figure 2:
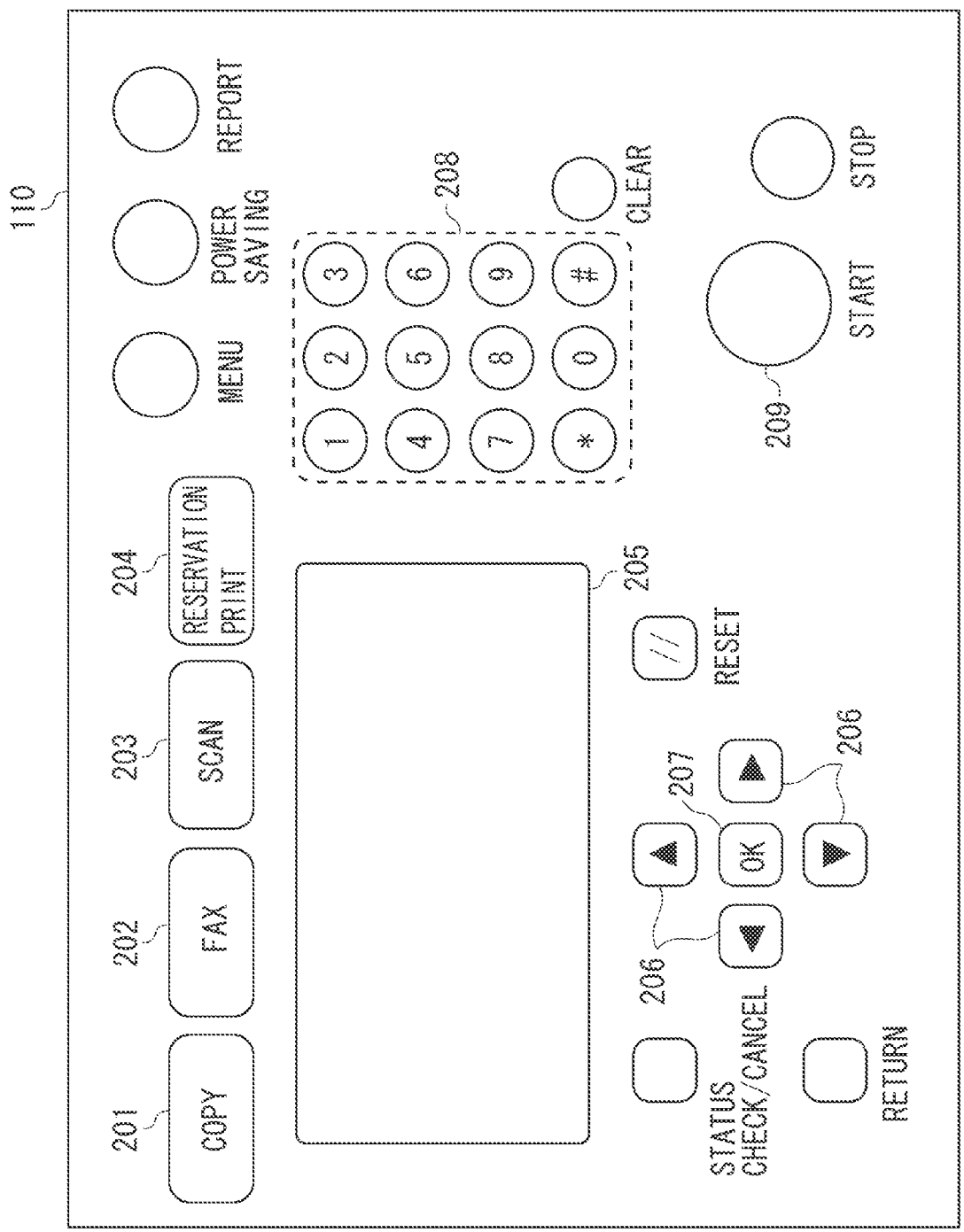
FIG. 2 is a diagram illustrating a hardware configuration of an operation panel.

FIG. 2 is a diagram illustrating a hardware configuration of the operation panel 110. The operation panel 110 includes functions keys 201, 202, 203, and 204 so that a user can select copy, facsimile, scanning, and reservation printing functions, respectively. The user presses the function key corresponding to a function that needs to be performed. A display unit 205 notifies the user of a setting state and a device state. Arrow keys 206 include up, down, right, and left buttons. An OK key 207 is pressed when the user determines or instructs a setting. The user also presses the OK key 207 when responding to a query. A numeric keypad 208 is used to input numerals. A start key 209 is pressed when the user instructs an execution of a job. Since other keys on the operation panel 110 illustrated in FIG. 2 are not used in the present exemplary embodiment, descriptions thereof are omitted.

For example, when the user changes a copy function setting, the user first presses the function key 201. When the function key 201 is pressed, the display unit 205 displays a copy function screen. The user presses the arrow keys 206 to select a setting item (e.g., sheet size) that needs to be changed, and presses the OK key 207. When the OK key 207 is pressed, the display unit 205 displays a setting screen so that the user can select a setting value. The user presses the arrows keys 206 to select a desired setting value (e.g., A3), and presses the OK key 207. Accordingly, the setting value selected by the user is set as a setting of the copy function. When the user presses the start key 209, the MFP 100 starts a copying operation.

Now, print control processing performed by the MFP 100 will be described. In the present exemplary embodiment, the MFP 100 has a function of reserving a print job. The term "to reserve a print job" represents a case where a print job is stored in a storage unit such as the RAM 103 or the HDD 117 until a user inputs a print instruction using the operation panel 110, and the printer 100 executes the printing based on the print job after the print instruction has been input using the operation panel 110. This function is hereafter called "reservation printing", and the MFP 100 is capable of performing the reservation printing.

Figure 3:
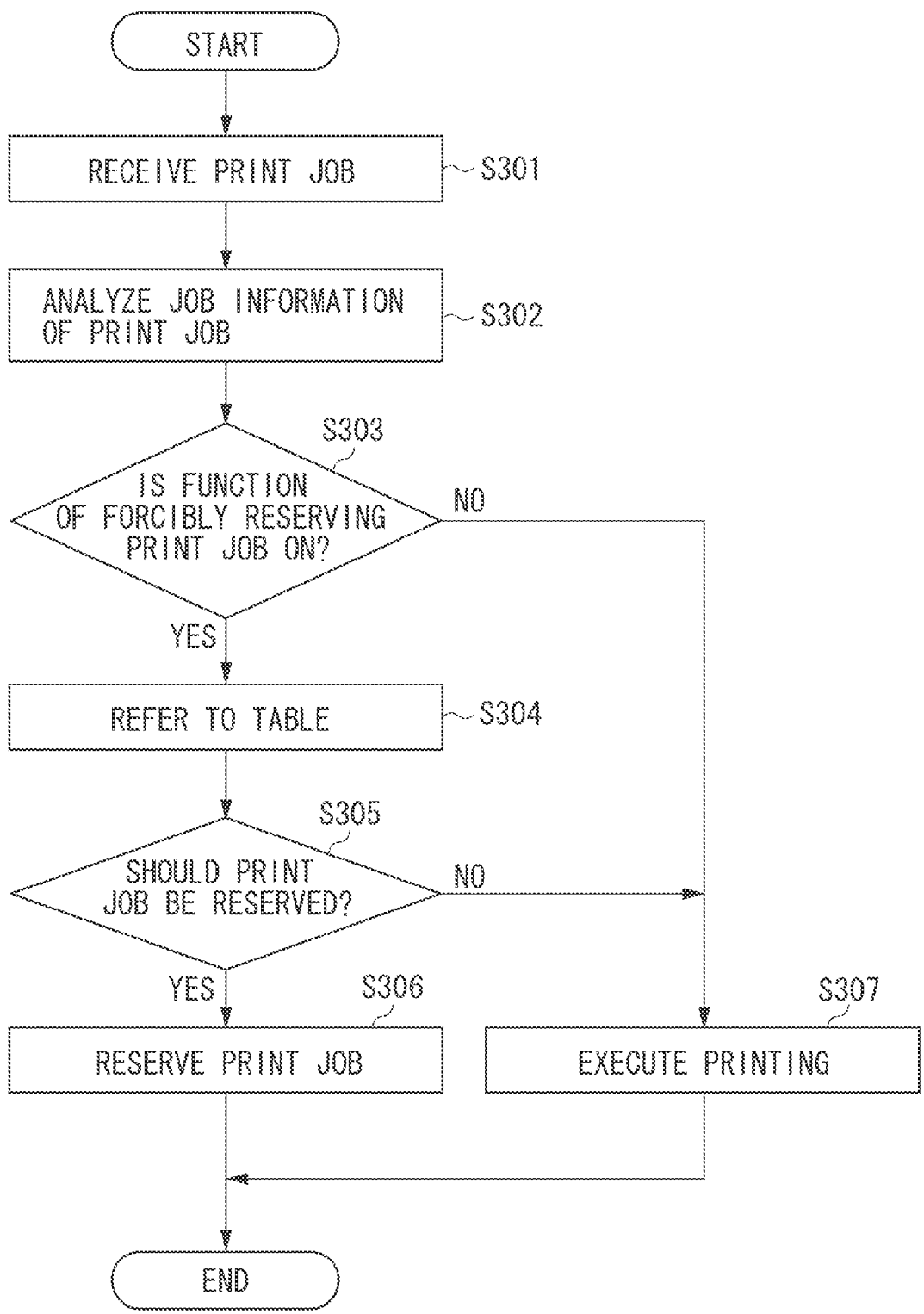
FIG. 3 is a flowchart illustrating print control processing according to a first exemplary embodiment of the present invention.

FIG. 3 is a flowchart illustrating print control processing according to the first exemplary embodiment of the present invention. The CPU 102 executes a control program to execute the print control processing illustrated in FIG. 3.

In step S301, when the network I/F 113 receives a print job from an external device via a network, the CPU 102 receives the print job via the network I/F 113. In the first exemplary embodiment, a protocol used to receive the print job may be a unique protocol or a general-purpose protocol. Upon receipt of the print job, in step S302, the CPU 102 analyzes job information of the print job to determine a type of the print job.

The print job includes print data to be printed and job information. The job information includes a job identification (ID), a name of a user (a job owner) who has transmitted the job, a job type, a job size, and a print setting that is necessary when the print data is printed. The job types include PC print and cloud print. The job type may identify a type of the language used in the print job. In the present exemplary embodiment, however, a type of the language used in the print job is not described.

The "PC print" indicates a print job generated by a printer driver installed in an external device such as a PC. The printer driver causes a user interface screen to be displayed on a display device of the external device, so that the user can designate a variety of print settings on the user interface screen. The printer driver generates a print job including the print setting designated by the user, an identifier indicating the PC print, and the print data. Then, the printer driver transmits the print job to the MFP 100.

The "cloud print" indicates a print job issued by a cloud service. According to the cloud print, an external device such as a smartphone and a tablet terminal accesses the cloud service to instruct the cloud service to print a desired file. The cloud service is provided by an external device such as a server computer. The cloud service generates a print job including a print setting designated by the user, an identifier indicating the cloud print, and a file designated by the user (or print data generated from the file designated by the user). Upon generation of the print job, the cloud service transmits the print job to the MFP 100. The print job generated by the cloud service can be directly transmitted from the cloud service to the MFP 100. Alternatively, the print job may be transmitted from the cloud service to the MFP 100 through an external device such as a smartphone and a tablet terminal. The file to be designated by the user may be stored in a cloud service server or the external device such as the smartphone and the tablet terminal. If the file is stored in the external device such as the smartphone and the tablet terminal, the external device transmits the file to the cloud service server. Even if the cloud print is used, the user can designate a desired print setting.

In the present exemplary embodiment, there are two print job types which are the "PC print" and the "cloud print". However, other print job types may be used. For example, "Wi-Fi direct print" may be used. The "Wi-Fi direct print" indicates a print job transmitted from the external device such as the smartphone and the tablet terminal using Wi-Fi.

In the present exemplary embodiment, the number of print setting items settable by the cloud print is less than that settable by the printer driver. Among the plurality of print settings which can be designated by the printer driver, some of the print settings cannot be designated by the cloud print.

According to the present exemplary embodiment, in the cloud print, there are four settable items. These four items are an N in 1 layout (N pages are arranged on one sheet), one-sided printing/two-sided printing, the number of copies, and monochrome printing/color printing. In the printer driver, two items such as finishing (stapling, sorting, and bookbinding) and a type of the paper to be used in printing can be set in addition to the above four items.

When the print job type is determined, then in step S303, the CPU 102 determines whether a function of forcibly reserving the print job is ON. The function of forcibly reserving the print job determines whether the print job should be reserved based on the table described below, and reserves a predetermined type of the print job. In the present exemplary embodiment, the user uses the operation panel 110 to select beforehand whether the function of forcibly reserving the print job should be ON. If this function is selected to be ON, a setting value indicating that the function is ON is stored in the RAM 103 or the HDD 117. Accordingly, the CPU 102 refers to the setting value to determine whether the function of forcibly reserving a print job is ON. If such a function is ON, a print job that is not designated for reservation is also reserved.

If the function of forcibly reserving a print job is OFF (NO in step S303), the operation proceeds to step S307. In step S307, the CPU 102 controls the printing unit 106 to print the print data based on the print setting included in the print job. Herein, the printing unit 106 prints the print data without waiting for an input of a print instruction from the user through the operation panel 110. In such a case, although the print job is temporarily stored in a storage unit such as the RAM 103 or the HDD 117, the printing based on the print job is executed without waiting for the print instruction input through the operation panel 110.

Figure 4:
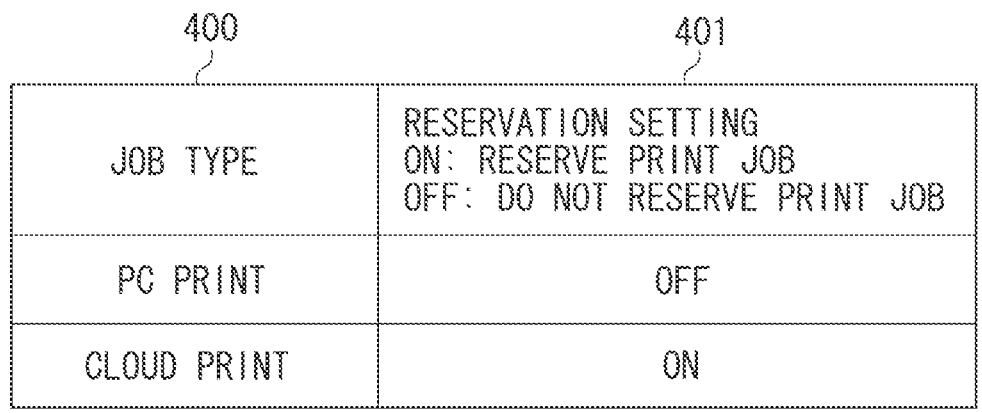
FIG. 4 illustrates a table indicating whether a print job should be reserved on a print job type basis.

If the function of forcibly reserving a print job is ON (YES in step S303), then in step S304, the CPU 102 refers to a table illustrated in FIG. 4. The table in FIG. 4 indicates whether the print job should be reserved on a print job type basis. In FIG. 4, a column 400 indicates a job type, whereas a column 401 indicates whether the print job should be reserved. The table illustrated in FIG. 4 is stored in the RAM 103 or the HDD 117.

A setting value in the column 401 is desirably ON with respect to a type of print job in which the number of print setting items settable by an external device is small. Reservation of such a type of print job enables the user to select a print setting that cannot be selected by the external device. Herein, the selection is made with the operation panel 110. A setting value in the column 401 may be changeable or unchangeable. In a case where the setting value in the column 401 is changeable, the user uses the operation panel 110 to change the setting value in the column 401.

In step S305, the CPU 102 determines whether the print job should be reserved based on the print job type determined in step S302 and the table illustrated in FIG. 4. If the CPU 102 determines that the print job should not be reserved (NO in step S305), the operation proceeds to step S307. If the CPU 102 determines that the print job should be reserved (YES in step S305), then in step S306, the CPU 102 reserves the print job in a storage unit such as the RAM 103 or the HDD 117.

Figure 5:
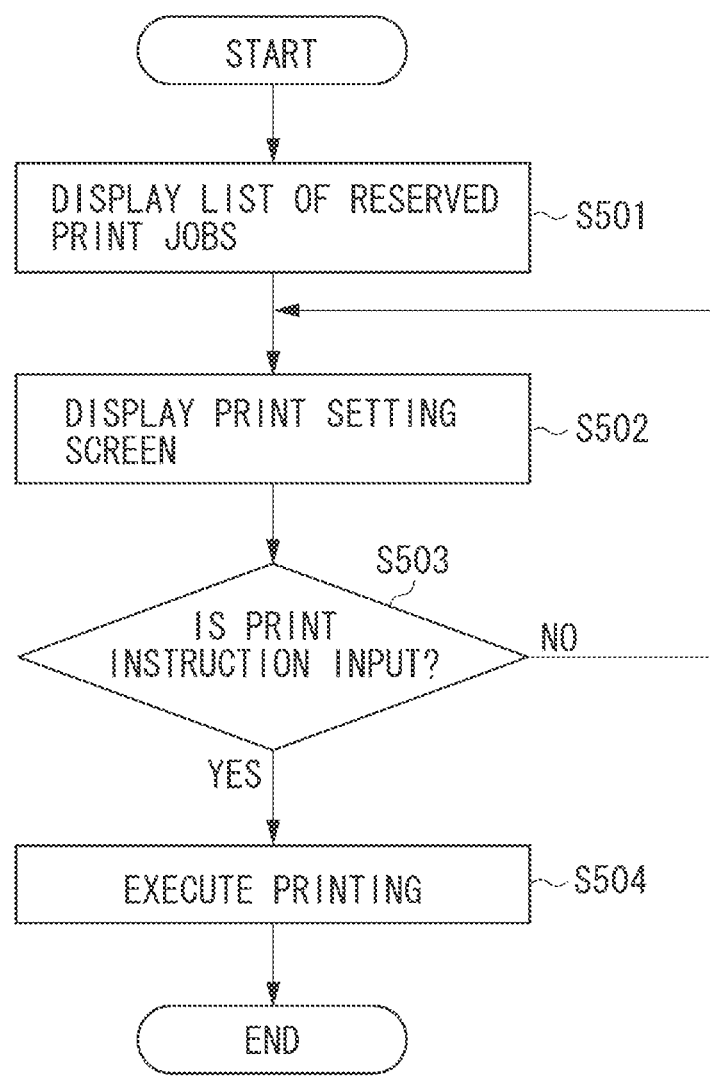
FIG. 5 is a flowchart illustrating print control processing performed when reservation printing is executed.

FIG. 5 is a flowchart illustrating print control processing performed when the reservation printing is executed. The CPU 102 executes a control program to execute the print control processing illustrated in FIG. 5.

In step S501, when the user presses the function key 204, the CPU 102 causes the display unit 205 to display a list of print jobs reserved in the storage unit such as the RAM 103 or the HDD 117. The list of print jobs contains one or a plurality of the reserved print jobs. The user presses the arrow keys 206 to select a desired print job from the list of the print jobs, and presses the OK key 207. In step S502, when the OK key 207 is pressed, the CPU 102 causes the display unit 205 to display a print setting screen.

On the print setting screen, the user can change a print setting included in the print job. Moreover, the user can select a print setting that could not be selected by the external device. The user presses the arrow keys 206 to select a desired print setting, and presses the OK key 207. Upon selection of the desired print setting, the user presses the start key 209 to input a print instruction. In a case where the user does not need to change or select the print setting, the user presses the start key 209 without pressing the arrow keys 206 and the OK key 207.

On the operation panel 110, the user can set six items: an N in 1 layout, one-sided printing/two-sided printing, the number of copies, monochrome printing/color printing, finishing (stapling, sorting, and bookbinding), and a type of paper to be used in printing.

In step S503, the CPU 102 determines whether the print instruction is input. If the print instruction is input (YES in step S503), the operation proceeds to step S504. In step S504, the CPU 102 controls the printing unit 106 to print the print data based on the print setting included in the print job and the print setting set on the operation panel 110.

According to the first exemplary embodiment of the present invention, therefore, the MFP 100 determines whether to reserve a print job based on a print job type. Thus, the MFP 100 can promptly execute a print job that is not necessarily be reserved. On the other hand, the MFP 100 waits until a print instruction is input on the operation panel 110 to execute a print job that is determined to be reserved.

In the first exemplary embodiment of the present invention, the MFP 100 determines whether to reserve a print job based on a job type. In a second exemplary embodiment, the MFP 100 determines whether to reserve a print job based on a print job type and a setting value of the print job. For example, if the number of pages of print data is 1, a print setting for arranging a plurality of pages in one sheet and a print setting for designating two-sided printing are not necessary. Thus, the number of settable print setting items is reduced. Accordingly, if the number of pages of the print data is 1, reservation of the print job is rarely necessary. In the second exemplary embodiment, the MFP 100 determines whether to preserve the print job in consideration of the setting value such as the number of pages.

Figure 6:
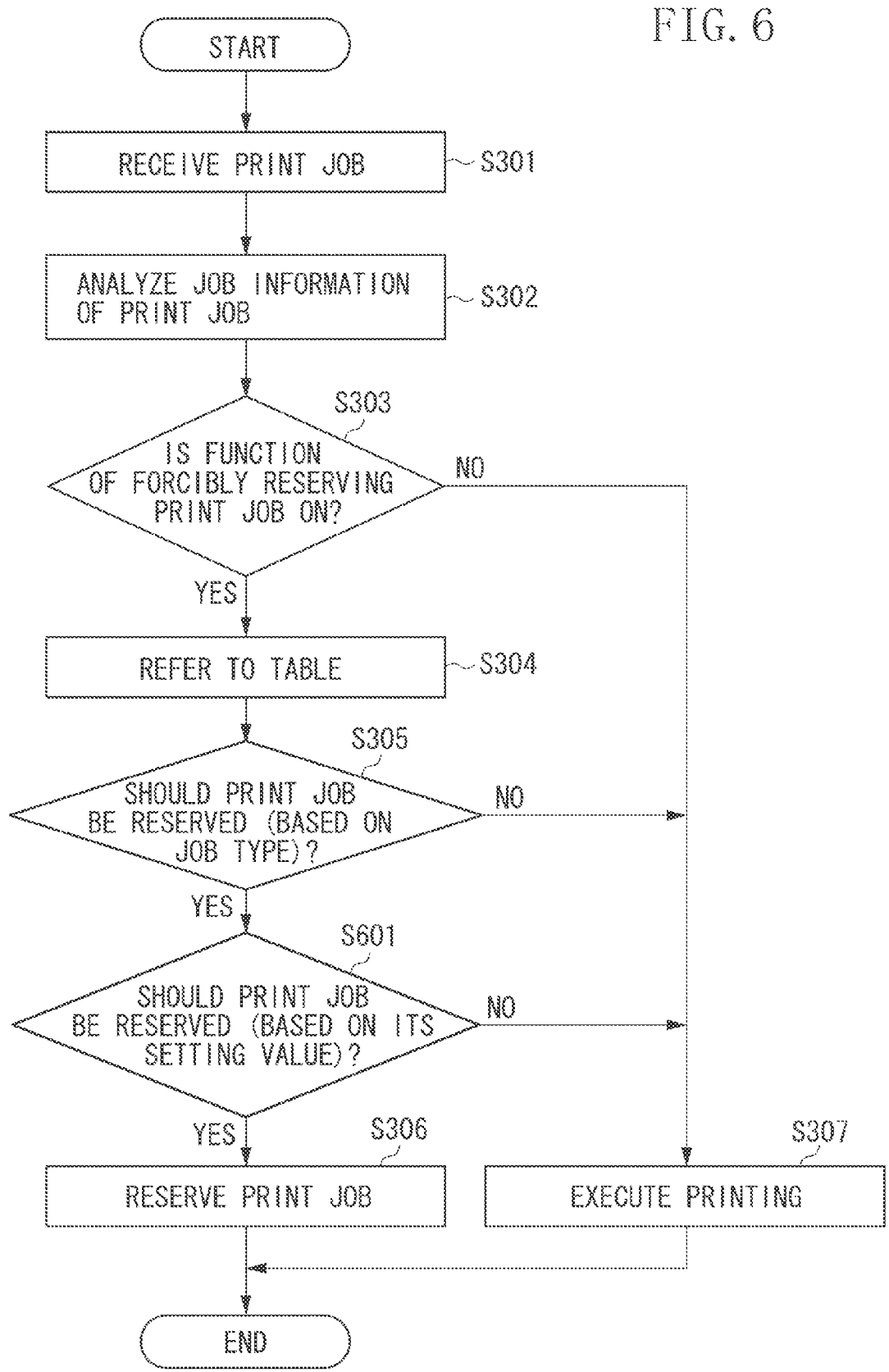
FIG. 6 is a flowchart illustrating print control processing according to a second exemplary embodiment of the present invention.

FIG. 6 is a flowchart illustrating print control processing according to the second exemplary embodiment of the present invention. The CPU 102 executes a control program to execute the print control processing illustrated in FIG. 6. Since processing in steps S301 through S307 illustrated in FIG. 6 is substantially the same as that in steps S301 through S307 illustrated in FIG. 3, a description thereof is omitted.

In step S601, the CPU 102 refers to a table illustrated in FIG. 7 to determine whether the print job should be reserved based on a setting value of the print job and the table illustrated in FIG. 7. The job information of the print job includes a plurality of setting values for respective print setting items. The CPU 102 may determine a setting value by analyzing the print data. For example, if job information does not include a print setting value indicating the number of pages, the CPU 102 can determine the number of pages by analyzing the print data.

The table illustrated in FIG. 7 is an exemplary table indicating a reservation condition of a print job with respect to each print setting item. A column 700 indicates a type of print setting item. A column 701 indicates a condition (hereinafter called a reservation condition) where a print job should be reserved. This table is stored in the RAM 103 or the HDD 117.

An interpretation of the exemplary table illustrated in FIG. 7 is as follows. If the number of pages of the print data is two or more, the print job should be reserved. If a layout of the print data is 1 in (an N in 1 layout indicates that N pages are arranged on one sheet), the print job should be reserved. If a one/two-sided print setting of the print data is one-sided printing, the print job should be reserved. If the number of copies of the print data is one or more, the print job should be reserved. If a monochrome/color print setting of the print data is monochrome printing, the print job should be reserved. According to the present exemplary embodiment, if the setting values of the print job satisfy all the reservation conditions 702 through 706, the CPU 102 determines that the print job should be reserved.

If the CPU 102 determines that the print job should not be reserved (NO in step S601), the operation proceeds to step S307. On the other hand, if the CPU 102 determines that the print job should be reserved (YES in step S601), the operation proceeds to step S306.

The reservation condition can be changed by a user. Each of FIGS. 8 through 13 is one example of a setting screen to be displayed on the display unit 205 so that the reservation condition is changed.

Figure 8:
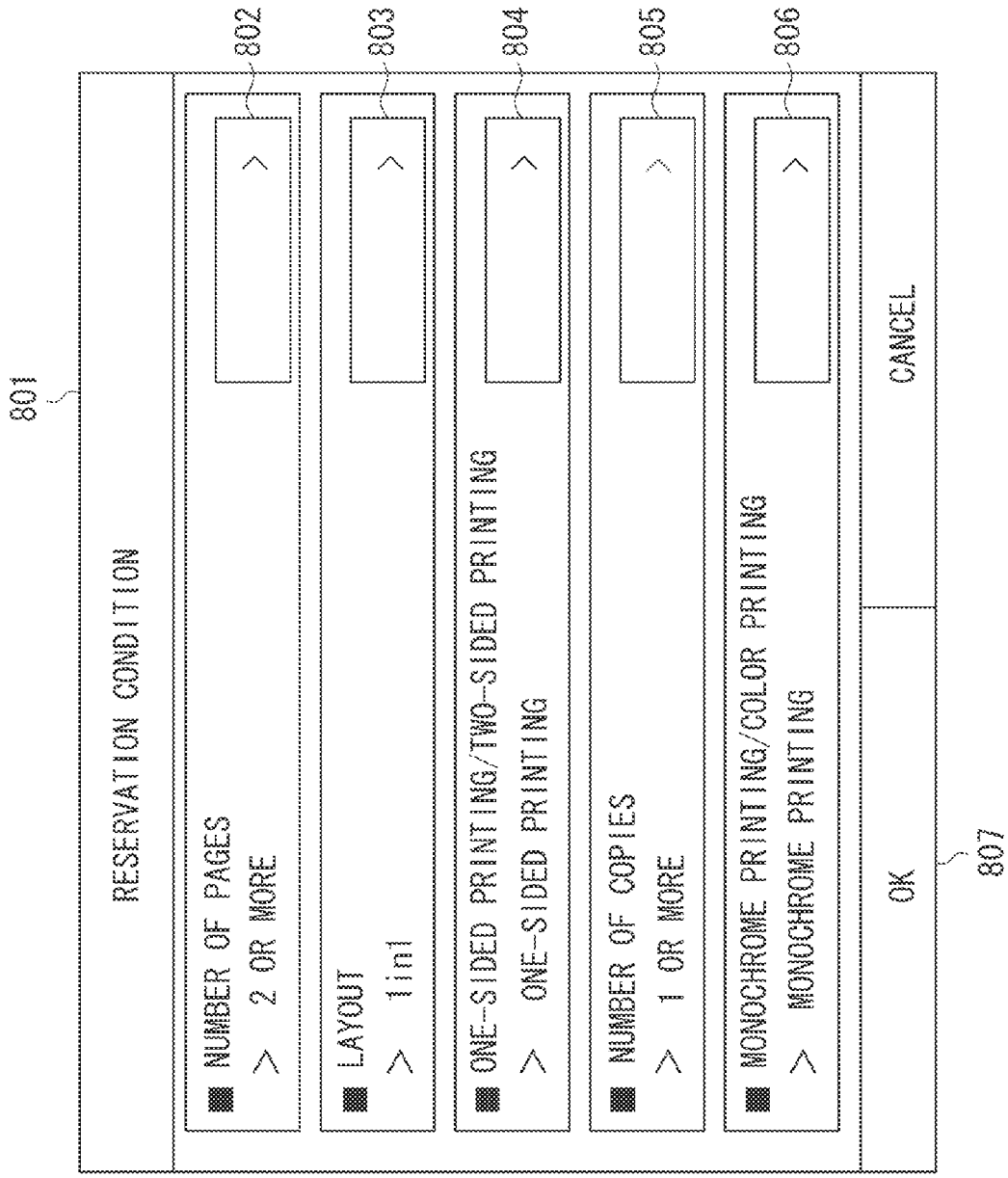
FIG. 8 is a diagram illustrating one example of a setting screen.

On a setting screen 801 illustrated in FIG. 8, the user can select a reservation condition that is intended to be changed. When the user presses an OK button 807 on the setting screen 801, the CPU 102 stores current reservation conditions in the table illustrated in FIG. 7.

Figure 9:
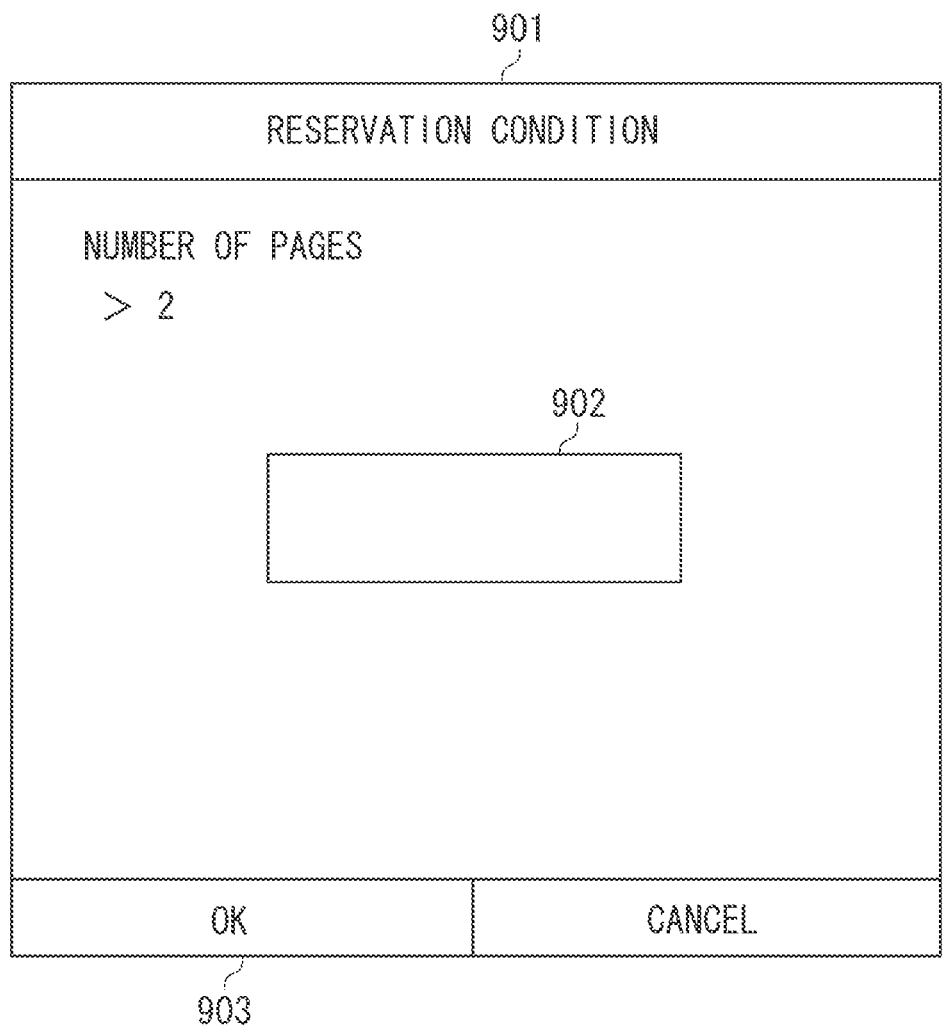
FIG. 9 is a diagram illustrating one example of a setting screen.

In a case where the user presses a button 802 on the setting screen 801 illustrated in FIG. 8, the CPU 102 controls the display unit 205 to display a setting screen 901 illustrated in FIG. 9. When a reservation condition regarding the number of pages is changed, the user presses the numeric keypad 208 on the operation panel 110 to input a numeral indicating the number of pages in an input area 902 on the setting screen 901. When the user presses an OK button 903 on the setting screen 901, the numeral input as the number of pages in the input area 902 is set as the reservation condition and the setting screen 801 is displayed on the display unit 205.

Figure 10:
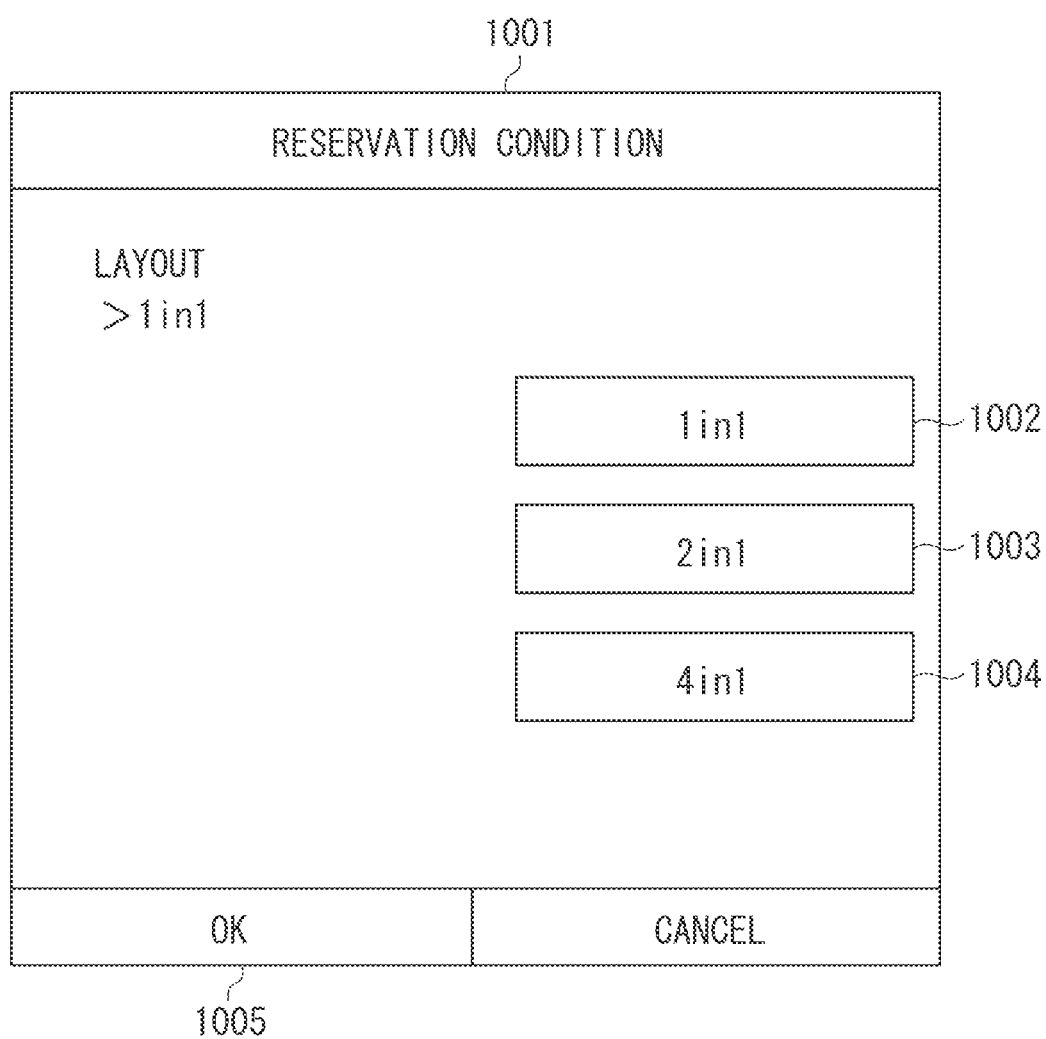
FIG. 10 is a diagram illustrating one example of a setting screen.

In a case where the user presses a button 803 on the setting screen 801 illustrated in FIG. 8, the CPU 102 controls the display unit 205 to display a setting screen 1001 illustrated in FIG. 10. When a reservation condition regarding a layout is changed, the user presses one of the buttons 1002 through 1004. When the user presses an OK button 1005, the selected layout is set as the reservation condition and the setting screen 801 is displayed on the display unit 205.

Figure 11:
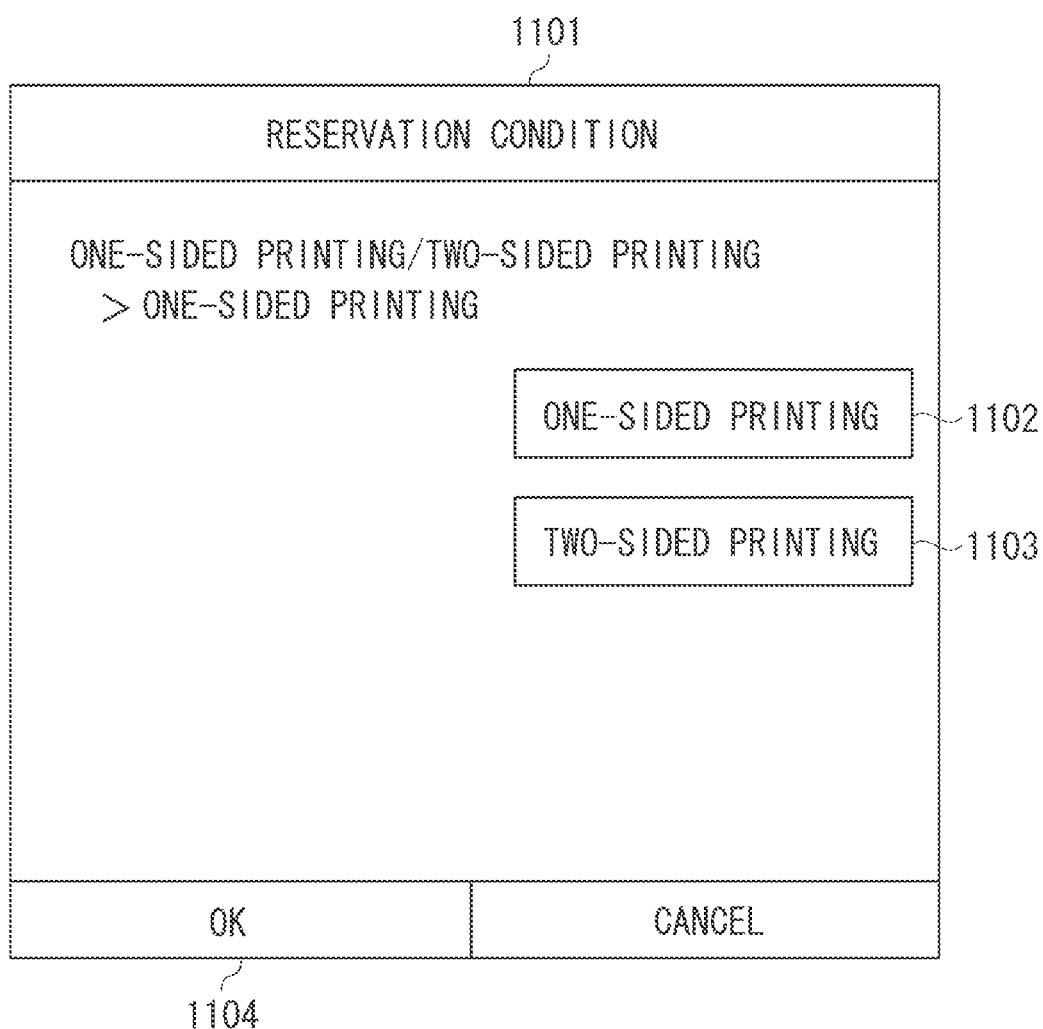
FIG. 11 is a diagram illustrating one example of a setting screen.

In a case where the user presses a button 804 on the setting screen 801 illustrated in FIG. 8, the CPU 102 controls the display unit 205 to display a setting screen 1101 illustrated in FIG. 11. When a reservation condition regarding one-sided printing/two-sided printing is changed, the user presses one of buttons 1102 and 1103 on the setting screen 1101. When the user presses an OK button 1104 on the setting screen 1101, the one-sided printing or the two-sided printing, which has been selected, is set as the reservation condition, and the setting screen 801 is displayed on the display unit 205.

Figure 12:
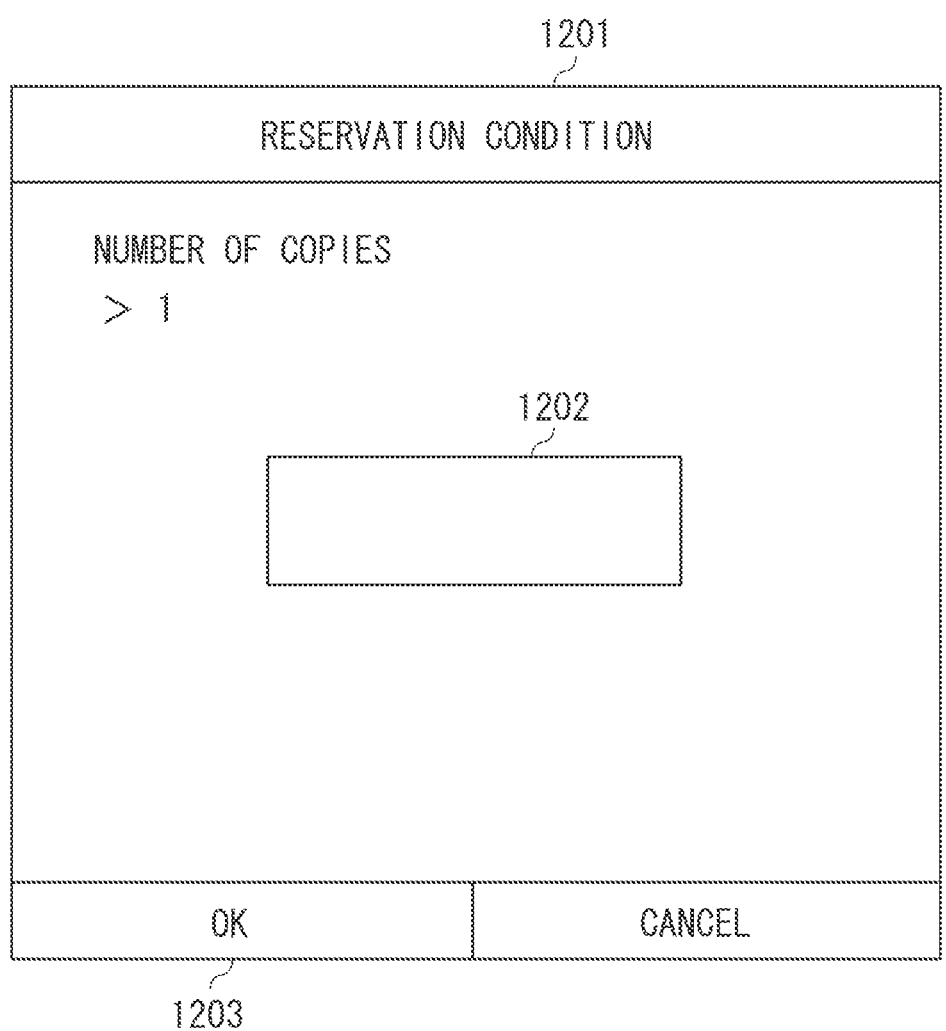
FIG. 12 is a diagram illustrating one example of a setting screen.

In a case where the user presses a button 805 on the setting screen 801 illustrated in FIG. 8, the CPU 102 controls the display unit 205 to display a setting screen 1201 illustrated in FIG. 12. When a reservation condition regarding the number of copies is changed, the user presses the numeric keypad 208 on the operation panel 110 to input a numeral indicating the number of copies in an input area 1202 on the setting screen 1201. When the user presses an OK button 1203 on the setting screen 1201, the number of copies input in the input area 1202 is set as the reservation condition and the setting screen 801 is displayed on the display unit 205.

Figure 13:
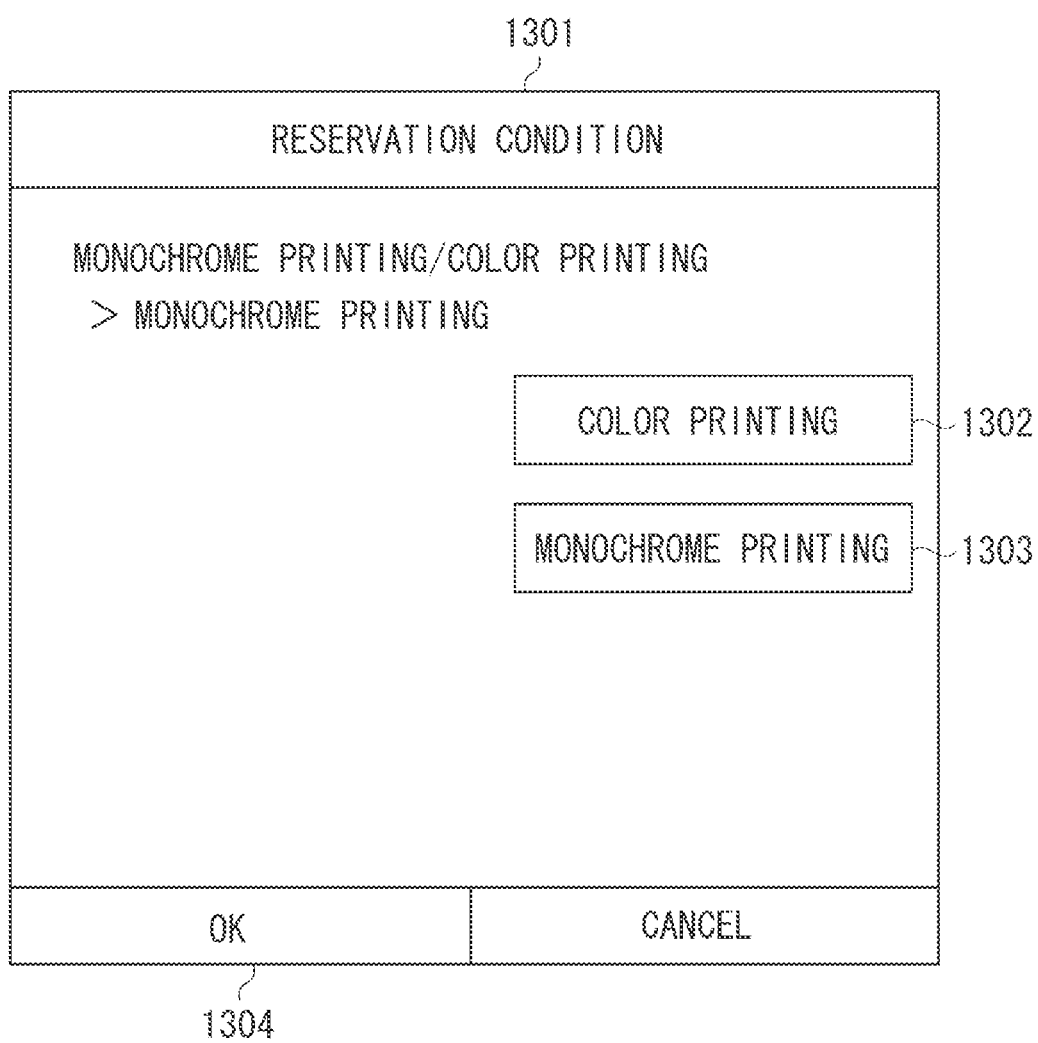
FIG. 13 is a diagram illustrating one example of a setting screen.

In a case where the user presses a button 806 on the setting screen 801 illustrated in FIG. 8, the CPU 102 controls the display unit 205 to display a setting screen 1301 illustrated in FIG. 13. When a reservation condition regarding monochrome printing/color printing is changed, the user presses one of buttons 1302 and 1303 on the setting screen 1301. When the user presses an OK button 1304, the selected monochrome printing or the selected color printing is set as the reservation condition. Subsequently, the setting screen 801 is displayed on the display unit 205.

In the second exemplary embodiment of the present invention, the CPU 102 determines whether a print job should be reserved based on a print job type and a setting value of the print job. Accordingly, the MFP 100 can promptly print a print job that has a print setting unlikely to be changed and rarely needs to be reserved. On the other hand, the MFP 100 can reserve a print job that is determined to be reserved in consideration of a print setting.

In the second exemplary embodiment of the present invention, setting values indicating the number of pages, a layout, one-sided printing/two-sided printing, the number of copies, monochrome printing/color printing are used. However, setting values of other print setting items may be used.

In the first and second exemplary embodiments of the present invention, the MFP 100 determines whether to reserve a print job based on a print job type. In a third exemplary embodiment of the present invention, the MFP 100 determines whether to reserve a print job based on a type of protocol that transfers the print job.

Figure 14:
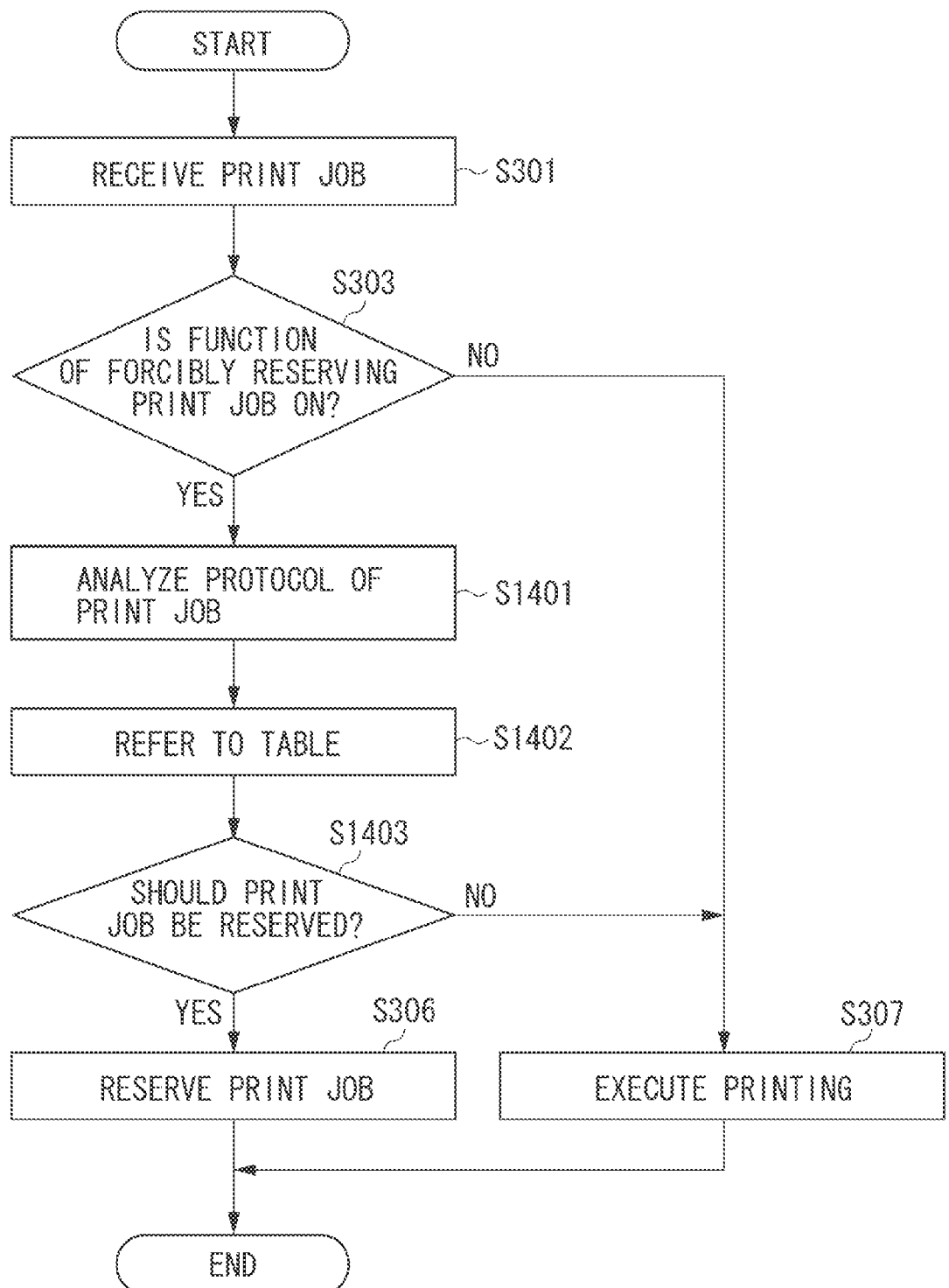
FIG. 14 is a flowchart illustrating print control processing according to a third exemplary embodiment of the present invention.

FIG. 14 is a flowchart illustrating print control processing according to the third exemplary embodiment of the present invention. The CPU 102 executes a control program to execute the print control processing illustrated in FIG. 14. Since processing in steps S301, S303, S306, and S307 illustrated in FIG. 14 is substantially the same as that in steps S301, S303, S306, and S307 illustrated in FIG. 3, a description thereof is omitted.

In step S1401, the CPU 102 determines a protocol used to transfer a print job. In the present exemplary embodiment, the protocol used to transfer a print job is LPR, RAW, WSD, or IPP.

When the network I/F 113 receives a packet including a print job from an external device via a network, the CPU 102 receives the packet through the network I/F 113. The CPU 102 analyzes the packet to determine the protocol corresponding to that packet. For example, in a case where different port numbers are allocated to four types of protocols, the CPU 102 determines the protocol of the print job based on the port number included in the packet. Alternatively, the CPU 102 may determine the protocol of the print job based on a packet structure or an identifier included in a packet.

In step S1402, the CPU 102 refers to a table illustrated in FIG. 15. The table in FIG. 15 indicates whether a print job transferred by each protocol type should be reserved. A column 1500 in the table illustrated in FIG. 15 indicates a protocol type. A column 1501 indicates whether a print job should be reserved. This table is stored in the RAM 103 or the HDD 117.

A protocol to be used depends on a printing system. In the present exemplary embodiment, a protocol such as the LPR or the RAW is used in PC print, whereas a protocol such as the WSD or the IPP is used in cloud print.

In the column 1501, a setting value is desirably ON with respect to a protocol used in a printing system in which the number of print setting items settable by an external device is small. In a case where a print job transferred by such a type of the protocol is reserved, a user can select a print setting that cannot be set by the external device. Herein, the selection is made with the operation panel 110. Alternatively, the setting value in the column 1501 may be changeable or unchangeable. For example, if a setting value in the column 1501 is changeable, the user uses the operation panel 110 to change the setting value in the column 1501.

In FIG. 15, there are four types of protocols. However, other protocols may be used. For example, the CPU 102 may determine whether Wi-Fi is used to transfer a print job. If the Wi-Fi is used, the MFP 100 can reserve the print job.

In step S1403, the CPU 102 determines whether the print job should be reserved based on the protocol determined in step S1401 and the table illustrated in FIG. 15. If the CPU 102 determines that the print job should not be reserved (NO in step S1403), the operation proceeds to step S307. If the CPU 102 determines that the print job should be reserved (YES in step S1403), the operation proceeds to step S306.

In the third exemplary embodiment, the MFP 100 determines whether to reserve a print job according to a protocol used to transfer the print job. Therefore, the MFP 100 can promptly execute a print job that is not necessarily be reserved. On the other hand, the MFP 100 waits until a print instruction is input on the operation panel 110 to execute a print job that is determined to be reserved.

Reservation of a print job may be designated through an external device. For example, a user designates reservation of a print job by using an external device. In such a case, the print job includes a print setting that designates the reservation of the print job.

In a fourth exemplary embodiment of the present invention, even when a function of forcibly reserving a print job is not ON, the MFP 100 can reserve a print job if the print job includes a print setting that instructs the MFP 100 to reserve the print job.

Figure 16:
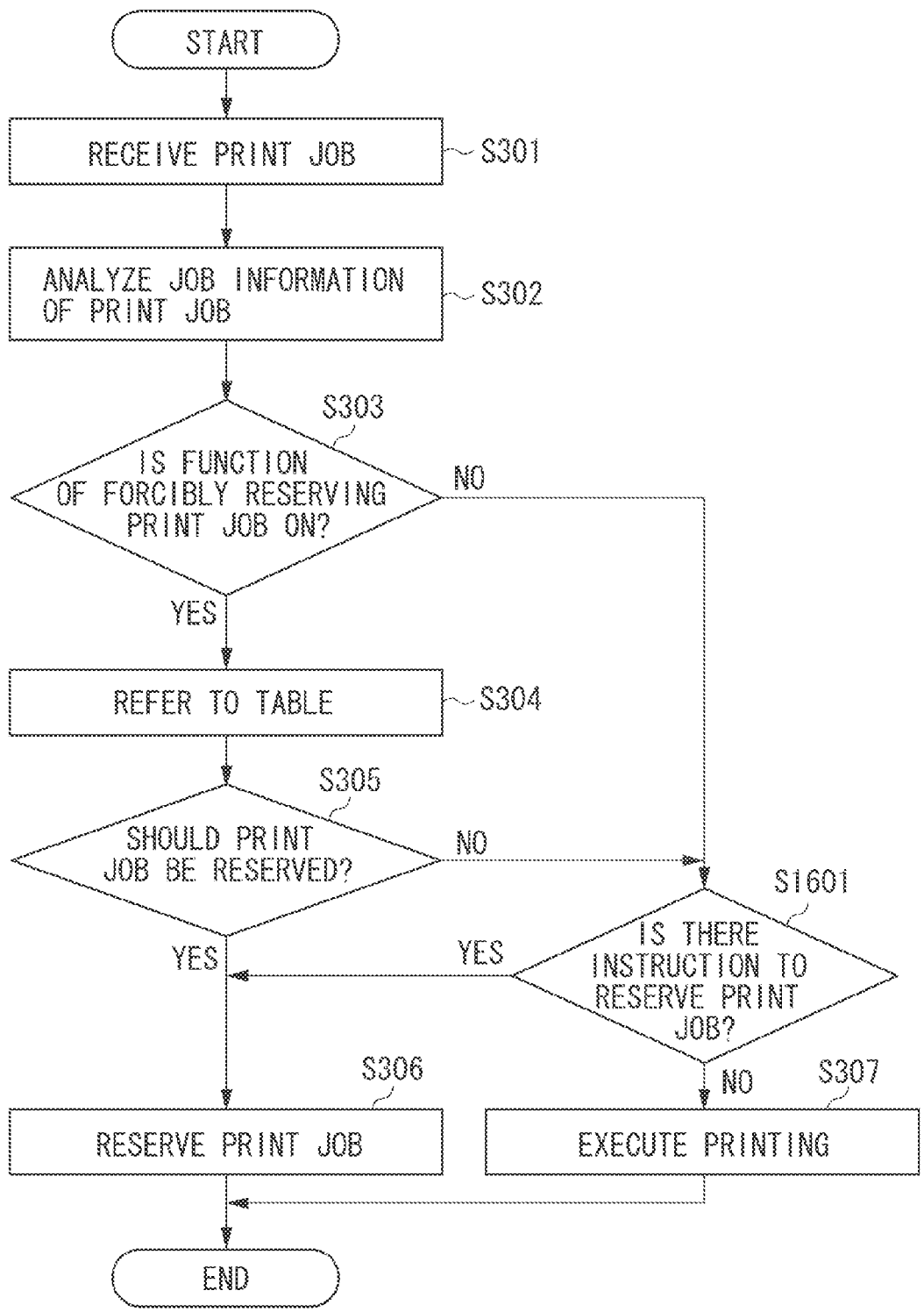
FIG. 16 is a flowchart illustrating print control processing according to a fourth exemplary embodiment of the present invention.

FIG. 16 is a flowchart illustrating print control processing according to the fourth exemplary embodiment of the present invention. The CPU 102 executes a control program to execute the print control processing. Since processing in steps S301 through S307 illustrated in FIG. 16 is substantially the same as that in steps S301 through S307 illustrated in FIG. 3, a description thereof is omitted.

In step S1601, the CPU 102 determines whether a print job includes a print setting that instructs the MFP 100 to reserve the print job. If the print job includes such a print setting (YES in step S1601), the operation proceeds to step S306. If the print job does not include such a print setting (NO in step S1601), the operation proceeds to step S307.

According to the fourth exemplary embodiment of the present invention, even when the function of forcibly reserving a print job is not ON, the MFP 100 can reserve the print job if the user who issues the print job desires reservation of the print job. On the other hand, even when the user cannot select the print setting indicating the print job reservation by using the external device, the user can use the function of reserving the print job by setting the function of forcibly reserving the print job to ON.

In FIG. 16, a modification example of the print control processing illustrated in FIG. 3 has been described. Similarly, the print control processing illustrated in FIG. 6 and FIG. 14 may be modified. That is, step S1601 of the flowchart illustrated in FIG. 16 may be added to the flowcharts illustrated in FIG. 6 and FIG. 14.

According to the first through fourth exemplary embodiments of the present invention, the MFP 100 determines whether to reserve a print job based on a job type or a protocol. In a fifth exemplary embodiment of the present invention, the MFP 100 determines, based on a job type or a protocol, whether to reserve a print job such that a print setting is changeable or addable, or reserve the print job without changing a print setting. That is, according to the fifth exemplary embodiment, the CPU 102 of the MFP 100 reserves the print job in a storage unit such as the RAM 103 or the HDD 117 in step S306 illustrated in each of FIGS. 3, 6, and 14. However, when the print job reserved in step S306 is selected in step S501 illustrated in FIG. 5, the CPU 102 controls the printing unit 106 to print data in response to a press on the start key 209 without causing the display unit 205 to display a print setting screen.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the first through sixth exemplary embodiments of the present invention, even when the MFP 100 receives a print job in which reservation printing is not designated, the MFP 100 can, depending on the print job, perform the reservation printing or print the print job without reservation. Moreover, the MFP 100 can, depending on the print job, print the print job after receiving a print setting or print the print job without waiting for the print setting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-251392 filed Dec. 4, 2013, which is hereby incorporated by reference herein in its entirety.

What is claimed is:

1. A printing apparatus capable of executing reservation printing in which a print job is received and printing is performed based on the print job after a print instruction of the print job is input, the printing apparatus comprising:

a receiving unit configured to receive a print job from an external device;

a printing unit configured to execute printing based on the print job received by the receiving unit;

a first determination unit configured to determine a protocol used to transfer the print job received by the receiving unit;

an instruction unit configured to input a print instruction of a print job after the receiving unit receives the print job; and a control unit configured, if a first print job received by the receiving unit is a print job that is not designated for the reservation printing and the first determination unit determines that a protocol used to transfer the first print job is a first protocol, to control the printing unit to execute printing based on the first print job after the instruction unit inputs a print instruction of the first print job, and configured, if a second print job received by the receiving unit is a print job that is not designated for the reservation printing and the first determination unit determines that a protocol used for transfer the second print job is a second protocol, to control the printing unit to execute printing based on the second print job without waiting for an input of a print instruction of the second print job from the instruction unit.

2. The printing apparatus according to claim 1, wherein the first determination unit determines a protocol used to transfer the first print job or the second print job based on a port number.

3. The printing apparatus according to claim 1, further comprising a first setting unit configured to set whether the reservation printing is to be executed with respect to the print job that is not designated for the reservation printing.

4. The printing apparatus according to claim 1, further comprising:

a storage unit configured to store a table indicating whether the reservation printing is to be executed for each protocol; and a second determination unit configured to determine, by referring to the table, whether the reservation printing is to be executed with respect to the print job received by the receiving unit.

5. The printing apparatus according to claim 1, wherein, when a third print job received by the receiving unit is a print job that is designated for the reservation printing and the first determination unit determines that a protocol used to transfer the third print job is the second protocol, the control unit controls the printing unit to execute printing based on the third print job after the instruction unit inputs a print instruction of the third print job.

6. The printing apparatus according to claim 1, further comprising a changing unit configured to change a print setting of the first print job,
wherein the printing unit executes printing based on the first print job according to the print setting changed by the changing unit.

7. The printing apparatus according to claim 1, further comprising a second setting unit configured to newly set a print setting of the first print job,
wherein the printing unit executes printing based on the first print job according to the print setting set by the second setting unit.

8. A printing control method for executing reservation printing in which a print job is received and printing is performed based on the print job after a print instruction of the print job is input, the printing control method comprising:
receiving a print job from an external device;
determining a protocol used to transfer the received print job;
executing printing based on a first print job after a print instruction of the first print job is input if the received first print job is a print job that is not designated for the reservation printing and the protocol used to transfer the first print job is determined to be a first protocol; and
executing printing based on a second print job without waiting for an input of a print instruction of the second print job if the received second print job is a print job that is not designated for the reservation printing and the protocol used to transfer the second print job is determined to be a second protocol.

9. A non-transitory computer-readable storage medium storing a program for executing reservation printing in which a print job is received and printing is performed based on the print job after a print instruction of the print job is input, the program causing a computer to perform operations comprising:
determining a protocol used to transfer a print job received from an external device;
executing printing based on a first print job after a print instruction of the first print job is input if the received first print job is a print job that is not designated for the reservation printing and the protocol used to transfer the first print job is determined to be a first protocol; and
executing printing based on a second print job without waiting for an input of a print instruction of the second print job if the received second print job is a print job that is not designated for the reservation printing and the protocol used to transfer the second print job is determined to be a second protocol.

* * * * *